(No Model.)
J. W. CRONAN.
BACK BAND BUCKLE.
No. 578,975. Patented Mar. 16, 1897.
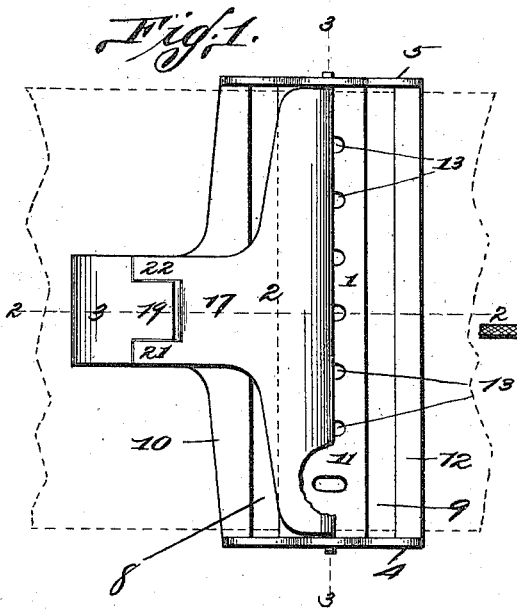
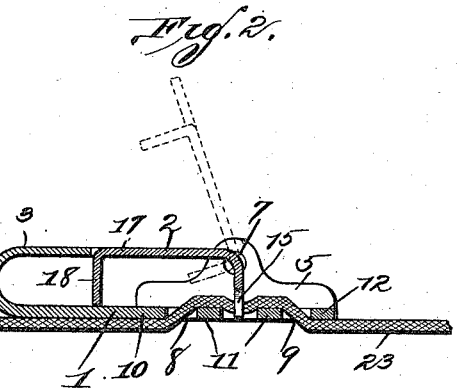
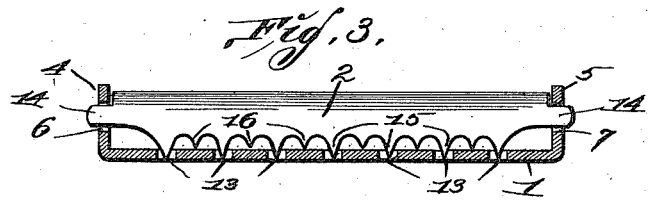
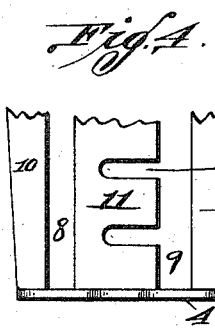
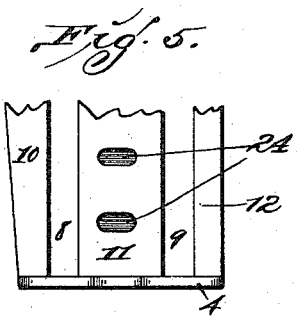
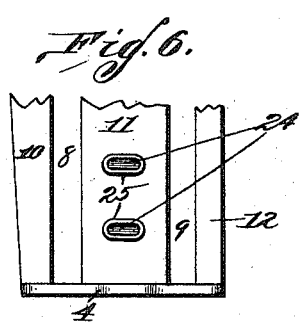
Attest
N. P. Smith
S. G. Wells
Inventor:—
J. W. Cronan
By Higdon & Higdon & Longan
attys.
THE NORRIS PETERS CO., PHOTO-LITHO., WASHINGTON, D. C.

UNITED STATES PATENT OFFICE.

JAMES W. CRONAN, OF POINT PLEASANT, MISSOURI.

BACK-BAND BUCKLE.

SPECIFICATION forming part of Letters Patent No. 578,975, dated March 16, 1897.

Application filed May 25, 1896. Serial No. 593,040. (No model.)

*To all whom it may concern:*

Be it known that I, JAMES W. CRONAN, of the city of Point Pleasant, New Madrid county, State of Missouri, have invented certain new and useful Improvements in Back-Band Buckles, of which the following is a full, clear, and exact description, reference being had to the accompanying drawings, forming a part hereof.

My invention relates to a back-band buckle; and it consists in the novel construction, combination, and arrangement of parts hereinafter shown, described, and claimed.

Figure 1 is a top plan view of my improved back-band buckle. Fig. 2 is a vertical sectional view on the line 2 2 of Fig. 1. Fig. 3 is a vertical sectional view on the line 3 3 of 1. Figs. 4, 5, and 6 show modified forms of the construction shown in Fig. 1.

In the construction of my improved back-band buckle I make use of two pieces of sheet metal, the body 1 and the clamp 2. The body 1 is approximately rectangular in plan view and has a hook 3 projecting from one of its sides and at the center thereof. The ends of said plate 1 are turned upwardly at right angles, thus forming the ears 4 and 5, having the alined apertures 6 and 7. Rectangular openings 8 and 9 extend in parallel lines longitudinally of the plate 1 and from ear to ear, thus forming the parallel outer bars 10 and 12 and the central gripping-plate 11.

A series of slots 13 is formed in the gripping-plate 11 in longitudinal alinement with the apertures 6 and 7, said slots being elongated crosswise of said gripping-plate.

The clamp 2 is formed from a T-shaped blank and is designed to fit between the ears 4 and 5. Horizontally-alined lugs 14 project from opposite ends of said tongue and form spindles which operate in the apertures 6 and 7 in the ears 4 and 5.

On the lower edge of the clamp 2 a series of teeth 15 is formed, which teeth are designed to project downwardly into the slots 13. Between the teeth 15 are shorter teeth 16, designed to project downwardly into close proximity with the upper surface of the gripping-plate 11. The upper part of the clamp 2 is bent backwardly at right angles to said teeth and is provided with an arm 17, the free end of which is split into three pieces, the central portion 18 being turned downwardly at right angles to engage against the upper surface of the bar 10. The free end 19 of the hook 3 is reduced in width to fit between the fingers 21 and 22, which are left by bending the central portion 18 downwardly.

The back-band 23 passes under the bar 12, thence upwardly through the slot 9, thence backwardly above the gripping-plate 11, thence downwardly through the slot 8, thence backwardly under the bar 10. During this operation the arm 17 of the clamp is raised, as shown in Fig. 2, thus raising the teeth and allowing the band to pass between the clamp and the plate. When the band has been drawn through to the desired position, the arm 17 is depressed and the teeth 15 pass through the band into the slots 13. The ends of the teeth 16 are embedded in the band, and thus the band is held securely in position.

When the arm 17 is depressed to its locked position, the arm 19 upon the free end of the hook 3, engaging in the space between the fingers 21 and 22, acts as a brace for the clamp 2 and prevents a shearing strain upon the lugs 14.

In Fig. 4 the slots 13 are extended to the edge of the gripping-plate 11 and communicate with the slot 9. In this form of plate the operation is the same as that just described.

In Fig. 5 a series of recesses 24 is formed in the gripping-plate 11 to take the place of the slots 13.

In Fig. 6 the recesses 24 are surrounded by a wall 25, which extends upwardly from the upper face of the gripping-plate 11.

A back-band buckle of my improved construction is very simple, cheap, and durable, and possesses many advantages over those heretofore in use.

I claim—

1. In a buckle, a clamp having teeth, part of said teeth being designed to pass through the material to be engaged by the buckle, and part of said teeth being designed to press into said material, and a gripping-plate under said teeth, said gripping-plate having depressions by which the longer of said teeth are permitted to pass below the plane occupied by the said material, substantially as specified.

2. In a buckle, a pivoted clamp, long and short teeth upon said clamp, and a gripping-plate under said teeth, said gripping-plate having depressions designed to allow the points of the longer teeth to descend into a plane below the plane occupied by the band upon which the buckle is to operate, substantially as specified.

3. In a buckle, three parallel bars joined together at their ends, the central one of said bars being designed for a gripping-plate, depressions upon the upper face of said gripping-plate, ears at each end of and above said gripping-plate, an arm projecting from the outer edge of one of said bars and forming a hook, a clamp pivoted in said ears, and long and short teeth upon said clamp, said long teeth being designed to descend into said depressions, substantially as specified.

4. In a buckle, three parallel bars joined together at their ends, the central one of said bars being designed to operate as a gripping-plate, an arm projecting outwardly from the outer edge of one of the outer bars and forming a hook, ears at the ends of and above said gripping-plate, a clamp pivoted in said ears, long and short teeth upon said clamp, depressions in the upper surface of said gripping-plate and designed to receive the ends of said long teeth, an arm projecting backwardly from said clamp, the free end of said arm being split into three pieces and the central one of said pieces being bent downwardly at right angles to have its end engage said first-mentioned arm and the outer ones of said pieces projecting backwardly to engage upon either side of the free end of said first-mentioned arm, substantially as specified.

5. In a buckle, three parallel bars joined together at their ends, an arm projecting outwardly from the outer edge of one of the outer bars and forming a hook, a clamp pivoted above said bars, an arm projecting backwardly from said clamp, the free end of said arm being split into three pieces and the central one of said pieces being bent at right angles to engage said first-mentioned arm and thus close said hook, substantially as specified.

6. In a buckle, three parallel bars joined together at their ends, the central one of said bars being designed to operate as a gripping-plate, depressions from the face of said gripping-plate, said depressions being located approximately midway between the sides of said gripping-plate, and a pivoted clamp provided with teeth and in position to have the points of said teeth operate in said depressions, substantially as specified.

7. In a buckle, a gripping-plate, a series of depressions formed from the face of said plate, said depressions extending in a line longitudinally of the plate and at approximately the center of said plate, and a pivoted clamp provided with teeth and in position to have the points of said teeth operate in said depressions, said teeth, when in their locked position, extending directly toward points midway between the sides of said gripping-plate and on a line with the pivots of said clamp, substantially as specified.

8. In a buckle, a gripping-plate, a series of depressions formed from the face of said plate, said depressions extending in a line longitudinally of said plate and at approximately the center of said plate, a pivoted clamp provided with alternating long and short teeth and in position to have the points of said long teeth operate in said depressions and the points of said short teeth operate adjacent to the face of said plate, substantially as specified.

In testimony whereof I affix my signature in presence of two witnesses.

JAMES W. CRONAN.

Witnesses:
  S. G. WELLS,
  MAUD GRIFFIN.